(12) United States Patent
Kong et al.

(10) Patent No.: US 9,257,858 B2
(45) Date of Patent: Feb. 9, 2016

(54) APPARATUS AND METHOD FOR CONTROLLING A CHARGING CIRCUIT IN A POWER OVER ETHERNET DEVICE

(75) Inventors: Chio Fai Aglaia Kong, San Jose, CA (US); Guangmin He, Shanghai (CN); Paul Chang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 907 days.

(21) Appl. No.: 13/371,668

(22) Filed: Feb. 13, 2012

(65) Prior Publication Data

US 2013/0207593 A1 Aug. 15, 2013

(51) Int. Cl.
*H02J 7/06* (2006.01)
*H02J 7/24* (2006.01)
*H02J 7/00* (2006.01)
*H02J 1/08* (2006.01)
*H04L 12/413* (2006.01)

(52) U.S. Cl.
CPC ............. *H02J 7/0047* (2013.01); *H02J 1/08* (2013.01); *H02J 7/0021* (2013.01); *H04L 12/413* (2013.01)

(58) Field of Classification Search
USPC .......................................................... 320/163
See application file for complete search history.

(56) References Cited

U.S. PATENT DOCUMENTS

| 2007/0210762 A1* | 9/2007 | Huang et al. ............... 320/166 |
| 2010/0042855 A1* | 2/2010 | Karam ........................ 713/310 |
| 2011/0298428 A1* | 12/2011 | Liu ............................. 320/162 |
| 2014/0111009 A1* | 4/2014 | Ruef ............................ 307/29 |

FOREIGN PATENT DOCUMENTS

DE 102010032513 A1 * 2/2012 ........ H04L 12/40013
DE 102010032513 A1 * 2/2012

OTHER PUBLICATIONS

Rehman, Ejaz ur, "Build a Smart Battery Charger Using a Single-Transistor Circuit," Electronic Design, Nov. 25, 2002, 2 pages.

* cited by examiner

*Primary Examiner* — Richard Isla Rodas
*Assistant Examiner* — David V Henze-Gongola
(74) *Attorney, Agent, or Firm* — Meunier Carlin & Curfman LLC

(57) ABSTRACT

A charging circuit and method for charging a power storage device in a power over Ethernet environment are necessary to prevent unnecessary power consumption. Power sourcing equipment continuously supplies power to a connected device after determining that the device is compatible. In order to prevent supply of power after a power storage device attains full charge, a charging circuit may include an interface for supplying electric power; a sensing circuit including a switch in series with a resistor; and a voltage detection circuit. The voltage detection circuit may communicate with the sensing circuit and may output a first signal that turns the switch OFF when the voltage of the power storage device is greater than or equal to a first voltage and may output a second signal that turns the switch ON when the voltage of the power storage device is less than or equal to a second voltage.

20 Claims, 4 Drawing Sheets

APPARATUS AND METHOD FOR CONTROLLING A CHARGING CIRCUIT IN A POWER OVER ETHERNET DEVICE

BACKGROUND

Many modern network-connectable, electronic devices require data connectivity as well as connection to power supplies. IP telephones, wireless LAN access points, Bluetooth access points, web cameras, digital still and video cameras, computers, tablets, liquid crystal displays, point-of-sale kiosks, network intercom systems, cellular telephones, security systems, gaming systems, etc. are examples of devices that require both data connectivity as well as connection to power supplies. Traditionally, each of these electronic devices had separate cables for data connectivity and power supply. With the advent of implementation of IEEE 802.3.af and IEEE 802.3.at standards, which are extensions of the existing Ethernet standard, power over Ethernet capability (i.e., supplying power over Ethernet cables) has become more common.

There are many advantages to supplying power over Ethernet. For example, power over Ethernet may result in more flexible network design because the powered devices can be situated in areas without access to power outlets. This may also result in cost savings because it removes the need to install additional power outlets. In addition, power over Ethernet may be safer because there is no need to deploy AC main power throughout the network. Thus, additional electronic devices will be designed to receive power over Ethernet for the reasons above, as well as because of higher power supply capabilities permitted under the standards. This is especially the case because the cost of adding power supplies to Ethernet switches is relatively low.

According to the existing standards, power sourcing equipment (PSE) executes a discovery process to determine whether a compatible device is connected to it before supplying power in order to prevent damage to the connected device. The PSE makes this determination by applying a relatively low voltage to the network cable and checking for the presence of a sensing resistor in the connected device. The PSE only supplies the full voltage after detecting the sensing resistor in the connected device. However, if the connected device includes a chargeable power storage device, the PSE continues to supply the full voltage so long as the PSE senses the sensing resistor, even after the power storage device attains full charge. This results in unnecessary power consumption.

SUMMARY

Disclosed herein are apparatuses and methods for charging a power storage device. A charging circuit for charging a power storage device in a power over Ethernet environment according to one implementation may include an interface for supplying electric power to the power storage device; a sensing circuit including a resistor and a switch that is disposed in series with the resistor; and a voltage detection circuit that detects a voltage of the power storage device. The voltage detection circuit may communicate with the sensing circuit and may output a first signal that turns the switch OFF when the voltage of the power storage device is greater than or equal to a first voltage and may output a second signal that turns the switch ON when the voltage of the power storage device is less than or equal to a second voltage.

In one example implementation, the supply of the electric power to the power storage device may be interrupted when the switch is OFF and uninterrupted when the switch is ON.

In another example implementation, the supply of the electric power to the power storage device may be interrupted by preventing current from flowing through the resistor.

Optionally, the first voltage may be approximately equal to the voltage of the power storage device when fully charged and the second voltage may be approximately equal to the voltage of the power storage device when drained. Alternatively or additionally, the first voltage and the second voltage may be variable.

The charging circuit may optionally include a resistor having a value between 19 and 26.5 kΩ. Further, the switch may optionally be a MOSFET.

In another example implementation, an electronic device may include the charging circuit discussed above. For example, the electronic device may be an IP telephone, a wireless LAN access point, a Bluetooth access point, a web camera, a digital camera, a cellular telephone, a computer, a tablet, a PDA, etc., or any other portable electronic device.

A charging circuit according to another example implementation may include an interface for supplying electric power to the power storage device; a sensing circuit including a resistor with a value between 19 and 26.5 kΩ and a switch that is disposed in series with the resistor; and a voltage detection circuit that detects a voltage of the power storage device. The voltage detection circuit may communicate with the sensing circuit and may output a first signal that turns the switch OFF when the voltage of the power storage device is greater than or equal to a first voltage and may output a second signal that turns the switch ON when the voltage of the power storage device is less than or equal to a second voltage.

In one example implementation, the supply of the electric power to the power storage device may be interrupted when the switch is OFF and uninterrupted when the switch is ON.

In another example implementation, the supply of the electric power to the power storage device may be interrupted by preventing current from flowing through the resistor.

Optionally, the first voltage may be approximately equal to the voltage of the power storage device when fully charged and the second voltage may be approximately equal to the voltage of the power storage device when drained. Alternatively or additionally, the first voltage and the second voltage may be variable.

The charging circuit may optionally include a MOSFET as the switch.

In another example implementation, an electronic device may include the charging circuit discussed above. For example, the electronic device may be an IP telephone, a wireless LAN access point, a Bluetooth access point, a web camera, a digital camera, a cellular telephone, a computer, a tablet, a PDA, etc., or any other portable electronic device.

A method for charging a power storage device in a power over Ethernet environment including a power source device and a powered device having a sensing resistor and a switch in series with the sensing resistor according to another example implementation may include monitoring voltage of the power storage device; preventing power from being supplied to the power storage device when the monitored voltage is greater than or equal to a first voltage by turning the switch OFF; and receiving power at the power storage device when the monitored voltage is less than or equal to a second voltage by turning the switch ON.

The method may optionally include outputting a first signal when the monitored voltage is greater than or equal to the first voltage, the first signal turning the switch OFF; and outputting a second signal when the monitored voltage is less than or equal to the second voltage, the second signal turning the switch ON. Alternatively or additionally, preventing power from being supplied to the power storage device may include preventing current from flowing through the sensing resistor.

Other apparatuses, methods, features and/or advantages will be or may become apparent to one with skill in the art upon examination of the following drawings and detailed description. It is intended that all such additional apparatuses, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for a charging power storage device in a power over Ethernet environment, it will become evident to those skilled in the art that the implementations are not limited thereto.

Figure 1A:
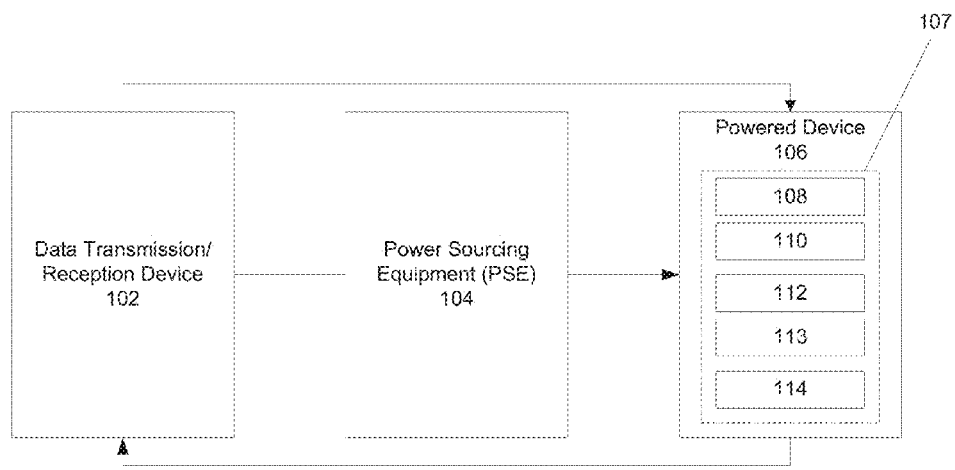
FIGS. 1A and 1B illustrates example block diagrams of systems for supplying power in a power over Ethernet environment.
Figure 1B:
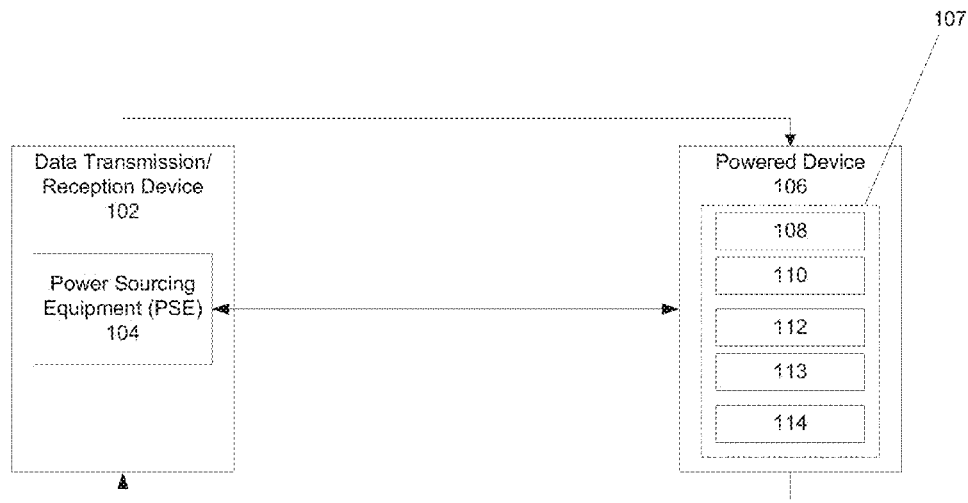

Referring to FIGS. 1A and 1B, simplified block diagrams of systems for supplying power in a power over Ethernet environment are illustrated. The systems comprise a data transmission/reception device 102, a PSE 104 and a powered device 106. The data transmission/reception device 102 may be an Ethernet switch, for example. In addition, the powered device 106 may be connected to the data transmission/reception device 102 and/or the PSE 104 using a network cable, such as CAT 3, CAT 5 or CAT 5e cable, for example. In a power over Ethernet environment, both data and power may be supplied over the same network cable.

FIG. 1A illustrates a system including a midspan power source. In this implementation, the PSE 104 injects power between the data transmission/reception device 102 and the powered device 106. In other words, the PSE 104 is separate and distinct from the data transmission/reception device 102. Typically, a midspan power source is utilized when the data transmission/reception device 102 does not include a power source. On the other hand, FIG. 1B illustrates a system including an endspan power source. In this implementation, the PSE 104 is included within the data transmission/reception device 102. As discussed above, the cost of adding the PSE 104 to the data transmission/reception device 102 is relatively low.

The powered device 106 may include a charging circuit 107 having a sensing circuit 108, a voltage detection circuit 110, an interface circuit 112, a DC/DC converter 113 and a power storage device 114, for example. The charging circuit may also include a rectifier circuit such as a bridge rectifier, for example, for converting AC current into DC current. The sensing circuit 108, the voltage detection circuit 110 and the interface circuit 112 are discussed in detail with regard to FIG. 3. The DC/DC converter 113 may be utilized to convert the voltage output by the PSE 102 to a lower voltage required by the powered device 106. For example, if the PSE 104 outputs a voltage in a range between 44 and 57 V, the DC/DC converter 113 may convert this voltage to a lower voltage such as 3, 5 or 12 V, as required by the powered device 106.

The powered device 106 may be any electronic device that requires electrical power during operation. Additionally, the powered device 106 may also require data connectivity during operation. IP telephones, wireless LAN access points, Bluetooth access points, web cameras, digital still and video cameras, computers, tablets, liquid crystal displays, point-of-sale kiosks, network intercom systems, cellular telephones, security systems, gaming systems, etc. are examples of a powered device 106. One skilled in the art, however, would understand that the powered device 106 is not limited to these devices, and may also include any portable electronic device that requires electrical power and/or data connectivity during operation.

Figure 2A:
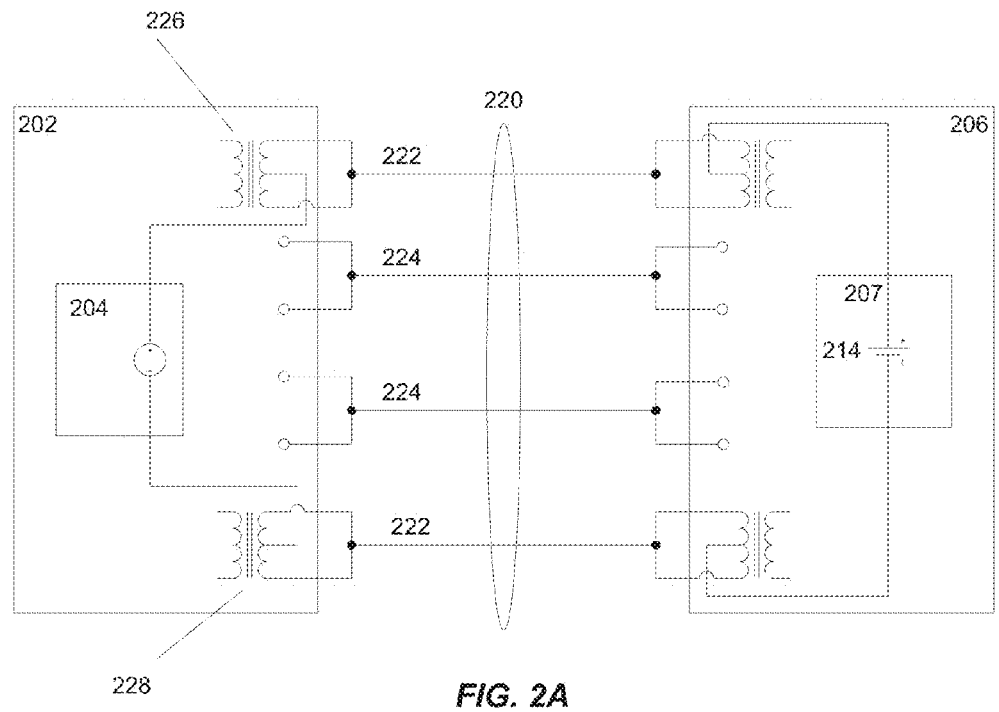
FIGS. 2A and 2B illustrates example circuit diagrams of power transmission in a power over Ethernet environment.
Figure 2B:
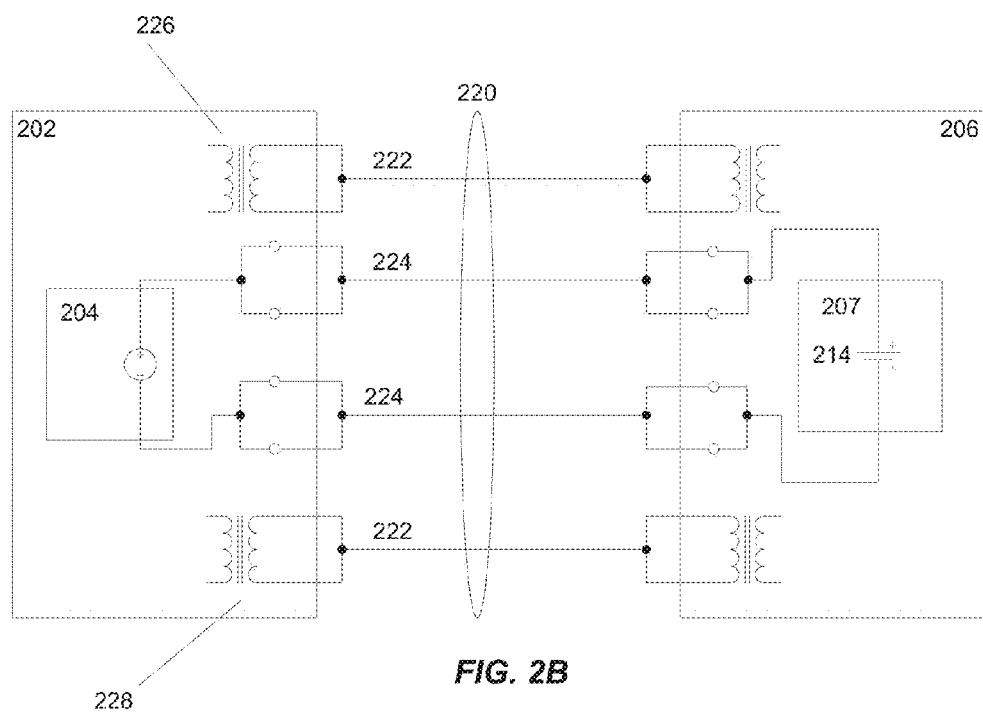

FIGS. 2A and 2B illustrate example circuit diagrams of power transmission in a power over Ethernet environment. These circuits may include a data transmission/reception circuit 202 having a PSE 204 and a powered device 206. As discussed above, in some implementations, the PSE 204 may not be included in the data transmission/reception circuit 202, and instead may be disposed in between the data transmission/reception circuit 202 and the powered device 206. In addition, the powered device 206 may include a charging circuit 207 and a power storage device 214 as well as the additional circuits discussed with regard to FIGS. 1A, 1B and 3. The data transmission/reception circuit 202 may be connected to the powered device 206 with a network cable 220. The network cable 220 may be an Ethernet cable such as CAT3, CAT5 or CAT5e cable, for example.

The network cable 220 may be implemented using Ethernet over twisted pair technology. For example, the network cable 220 may include four pairs of twisted wires. In systems complying with the 10BASE-T and 100BASE-TX Ethernet standards, only two of the four pairs of twisted wires are utilized for data transmission. Thus, power may be transmitted over the data transmission/reception twisted pairs 222 or the spare twisted pairs 224. On the other hand, although not illustrated, in systems complying with the 1000BASE-T Ethernet standard, all four pairs of twisted wires are utilized for data transmission. Thus, power must be transmitted over the data transmission/reception twisted pairs.

FIG. 2A illustrates one example circuit diagram of power transmission in a power over Ethernet environment. As discussed above, the data transmission/reception circuit 202 may be connected to the powered device 206 using the network cable 220. In FIG. 2A, the data may be transmitted over the data transmission/reception twisted pairs 222. For example, the data may be transferred/received over the pair on pins 1 and 2 and the pair on pins 3 and 6 of a CAT 5 or CAT 5e cable, respectively. Alternatively or additionally, power may be supplied over the data transmission/reception twisted pairs 222. It is possible to transfer power over the data transmission/reception twisted pairs 222 by using the center taps of the data transmission transformer 226 and the data reception transformer 228 because the pairs are transformer coupled at each end, i.e., it is possible to apply DC power to the center tap of the isolation transformer without interfering with the data transfer. Optionally, a voltage of either positive or negative polarity may be applied to the center tap of either the data transmission transformer 226 or the data reception transformer 228.

FIG. 2B illustrates another example circuit diagram of power transmission and a power over Ethernet environment. Similarly to FIG. 2A, the data transmission/reception circuit 202 may be connected to the powered device 206 using the network cable 220. However, in FIG. 2B, power is transferred over the spare twisted pairs 224. For example, power may be transferred over the pair on pins 4 and 5 and the pair on pins 7 and 8 of a CAT 5 or CAT 5e cable. Optionally, a voltage of either positive or negative polarity may be applied to either of the spare twisted pairs 224.

Figure 3:
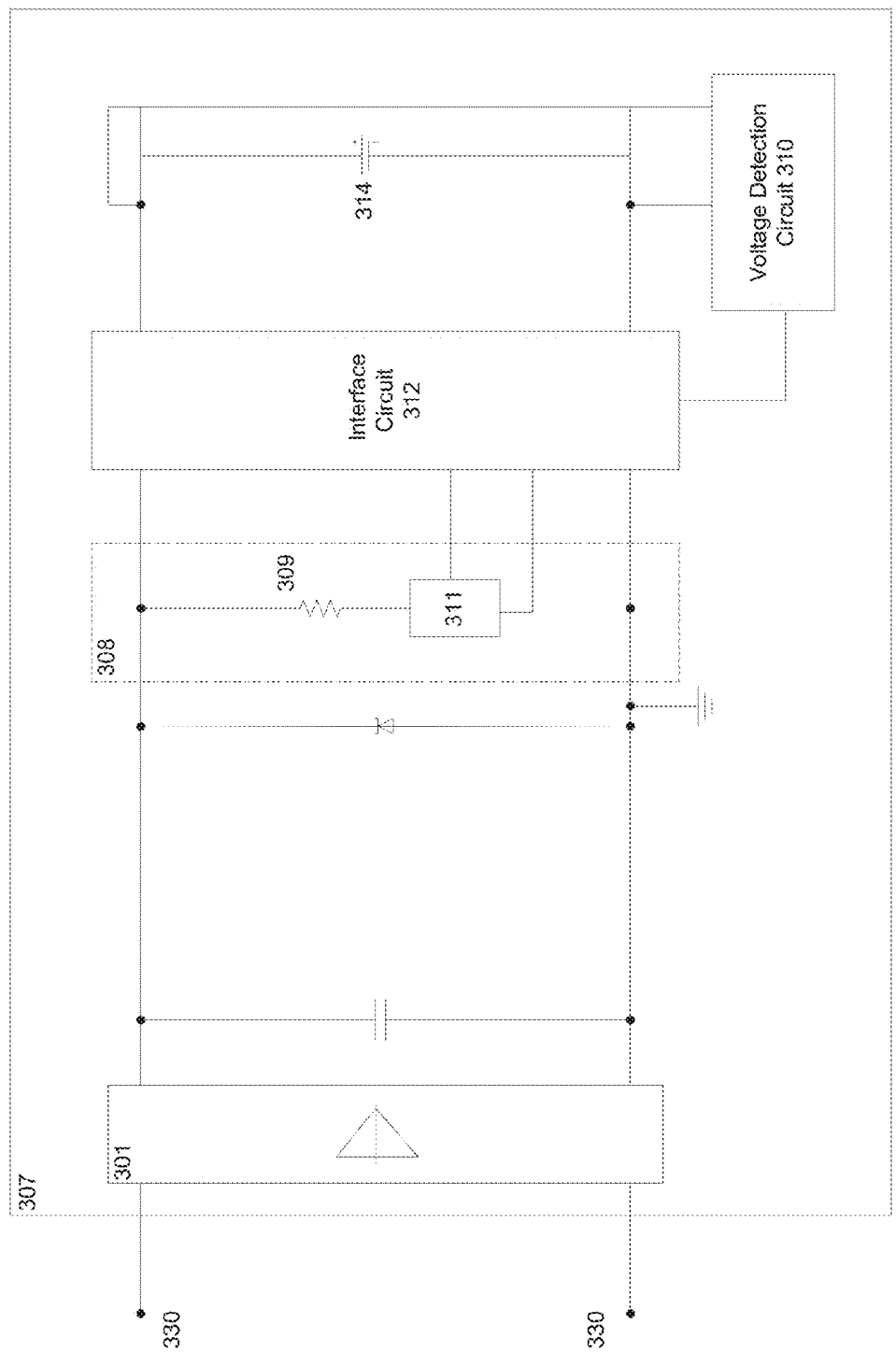
FIG. 3 illustrates an example circuit diagram of a charging circuit according to one example implementation of the invention.

Referring to FIG. 3, an example circuit diagram of a charging circuit according to an example implementation is illustrated. The charging circuit 307 may include a rectifier circuit 301, a sensing circuit 308, an interface circuit 312, a voltage detection circuit 310 and a power storage device 314. Power is received from the PSE through the twisted pairs 330.

According to existing Ethernet standards, in order to prevent damage to the powered devices connected to the PSE, the PSE executes a sensing process. Particularly, the PSE searches for powered devices that comply with the existing standards. For example, the PSE applies a relatively low voltage to the network cable and checks for the presence of a sensing resistor in the connected device. In preferred implementations, the sensing resistor may have a value in a range between 19 and 26.5 k$\Omega$. For example, in some implementations, the sensing resistor may be 25 k$\Omega$. Optionally, the value of the resistor may vary from the above range by 10%. In addition, the relatively small voltage may be approximately 2.7 to 10.1 V, for example. The PSE applies the full voltage (i.e., supplies power to the connected device) only after detecting the sensing resistor. The full voltage may be in a range between 44 and 57 V, for example. In other words, if the PSE does not detect the sensing resistor, the PSE does not supply power to the powered device. As discussed above, the PSE will continue to supply power to the powered device so long as it detects the sensing resistor, even after the power storage device attains full charge. This may result in unnecessary power consumption.

As shown in FIG. 3, a charging circuit 307 includes a sensing circuit 308 having a sensing resistor 309 in series with a switch 311. In some implementations, the value of the sensing resistor may preferably have a value between 19 and 26.5 k$\Omega$ for example, 25 k$\Omega$. In addition, the switch 311 may be a MOSFET. Alternatively, the switch may be another semiconductor device, transistor, logic gate, etc., or combination thereof.

In order to prevent unnecessary power consumption, the sensing resistor 309 is "removed" from the charging circuit 307, which causes the PSE to cease supplying power to the powered device because it no longer detects the sensing resistor. Accordingly, the PSE believes that the powered device has been removed from the port when it does not detect the sensing resistor. However, in actuality, the powered device remains connected to the port, and the powered device may continue to transmit/receive data, but the powered device will no longer receive power from the PSE. Thus, the charging circuit 307 is controlled such that the PSE stops supplying power to the powered device when the power storage device attains full charge.

Referring to FIG. 3, a voltage detection circuit 310 detects the voltage of the power storage device 314. When the voltage of the power storage device 314 is greater than or equal to a predetermined voltage, the voltage detection circuit 310 outputs a signal that causes the switch 311 to turn off (i.e., to open). This prevents current from flowing through the sensing resistor 309, which prevents the PSE from detecting the sensing resistor 309 and causes the PSE to interrupt the supply of power to the powered device. The predetermined voltage may be approximately equal to the voltage of the power storage device 314 when fully charged. Optionally, the predetermined voltage may be variable because it depends on the specific operating characteristics of the power storage device.

In addition, when the voltage of the power storage device 314 is less than or equal to a predetermined voltage, the voltage detection circuit 310 outputs a signal that causes the switch 311 to turn on (i.e., to close). This allows current to flow through the sensing resistor 309, which allows the PSE to detect the sensing resistor 309 and causes the PSE to supply power to the powered device. The predetermined voltage may be approximately equal to the voltage of the power storage device 314 when drained. Optionally, the predetermined voltage may be variable because it depends on the specific operating characteristics of the power storage device.

Figure 4:
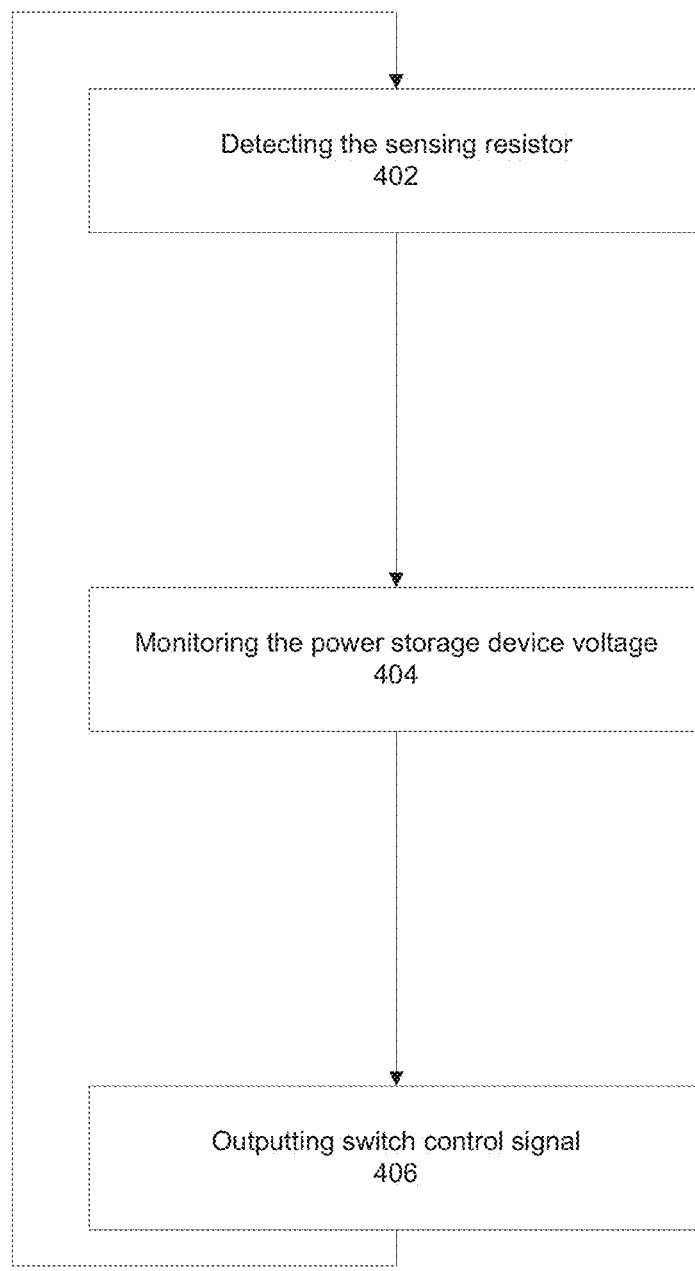
FIG. 4 illustrates an example flow diagram of a method for charging a power storage device in a power over Ethernet environment according to one example implementation of the invention.

Referring to FIG. 4, an example flow diagram of a method for charging a power storage device in a power over Ethernet environment according to one example implementation is illustrated. At 402, the sensing resistor is detected. For example, the PSE may execute a process to detect the sensing resistor. As discussed above, the PSE may apply a relatively small voltage to the network cable and check for the sensing resistor. The PSE will only supply power to the powered device after detecting the sensing resistor.

At 404, the voltage of the power storage device is monitored. When the voltage of the power storage device is greater than or equal to a predetermined voltage, a control signal is output at 406 in order to open the sensing circuit and prevent the PSE from detecting the sensing resistor, which causes the PSE to cease supplying power to the powered device. When the voltage of the power storage device is less than or equal to a predetermined voltage, a control signal is output at 406 in order to close the sensing circuit and allow the PSE to detect the sensing resistor, which causes the PSE to supply power to the powered device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A charging circuit in a powered device for charging a power storage device in a power over Ethernet environment, comprising:
    an interface for supplying electric power to the power storage device;
    a sensing circuit, within the powered device, including a resistor and a switch that is disposed in series with the resistor; and
    a voltage detection circuit, within the powered device, that detects a voltage of the power storage device, wherein the voltage detection circuit communicates with the sensing circuit, outputs a first signal that turns the switch OFF to prevent discovery of the powered device by power sourcing equipment when the voltage of the power storage device is greater than or equal to a first voltage and outputs a second signal that turns the switch ON to allow discovery of the powered device by the power sourcing equipment when the voltage of the power storage device is less than or equal to a second voltage.

2. The charging circuit of claim 1, wherein supply of the electric power to the power storage device is interrupted when the switch is OFF and uninterrupted when the switch is ON.

3. The charging circuit of claim 2, wherein supply of the electric power to the power storage device is interrupted by preventing current from flowing through the resistor.

4. The charging circuit of claim 1, wherein the first voltage is approximately equal to the voltage of the power storage device when fully charged and the second voltage is approximately equal to the voltage of the power storage device when drained.

5. The charging circuit of claim 4, wherein the first voltage and the second voltage are variable.

6. The charging circuit of claim 1, wherein the resistor has a value in a range between approximately 19 and 26.5 k$\Omega$.

7. The charging circuit of claim 1, wherein the switch is a MOSFET.

8. An electronic device, comprising:
the power storage device; and
the charging circuit of claim 1.

9. The electronic device of claim 8, wherein the electronic device is at least one of an IP telephone, a wireless LAN access point, a Bluetooth access point, a web camera, a digital camera, a cellular telephone, a computer, a tablet, a gaming system or a PDA.

10. A charging circuit within a powered device for charging a power storage device, comprising:
an interface for supplying electric power to the power storage device;
a sensing circuit, within the powered device, including a resistor having a value in a range between approximately 19 and 26.5 k$\Omega$ and a switch that is disposed in series with the resistor; and
a voltage detection circuit, within the powered device, that detects a voltage of the power storage device, wherein the voltage detection circuit communicates with the sensing circuit, outputs a first signal that turns the switch OFF to prevent discovery of the powered device by power sourcing equipment when the voltage of the power storage device is greater than or equal to a first voltage and outputs a second signal that turns the switch ON to allow discovery of the powered device by the power sourcing equipment when the voltage of the power storage device is less than or equal to a second voltage.

11. The charging circuit of claim 10, wherein supply of the electric power to the power storage device is interrupted when the switch is OFF and uninterrupted when the switch is ON.

12. The charging circuit of claim 11, wherein supply of the electric power to the power storage device is interrupted by preventing current from flowing through the resistor.

13. The charging circuit of claim 10, wherein the first voltage is approximately equal to the voltage of the power storage device when fully charged and the second voltage is approximately equal to the voltage of the power storage device when drained.

14. The charging circuit of claim 13, wherein the first voltage and the second voltage are variable.

15. The charging circuit of claim 10, wherein the switch is a MOSFET.

16. An electronic device, comprising:
the power storage device; and
the charging circuit of claim 10.

17. The electronic device of claim 16, wherein the electronic device is at least one of an IP telephone, a wireless LAN access point, a Bluetooth access point, a web camera, a digital camera, a cellular telephone, a computer, a tablet, a gaming system or a PDA.

18. A method for charging a power storage device in a power over Ethernet environment including a power source device and a powered device, the powered device having a sensing resistor and a switch in series with the sensing resistor, the method comprising:
monitoring voltage of the power storage device using a voltage detection circuit within the powered device;
preventing power from being supplied to the power storage device when the monitored voltage is greater than or equal to a first voltage by turning the switch OFF to prevent discovery of the powered device by the power source device; and
receiving power at the power storage device when the monitored voltage is less than or equal to a second voltage by turning the switch ON to allow discovery of the powered device by the power source device.

19. The method of claim 18, further comprising:
outputting a first signal when the monitored voltage is greater than or equal to the first voltage, the first signal turning the switch OFF; and
outputting a second signal when the monitored voltage is less than or equal to the second voltage, the second signal turning the switch ON.

20. The method of claim 18, wherein preventing power from being supplied to the power storage device further includes preventing current from flowing through the sensing resistor.

* * * * *